March 2, 1971 — L. A. CHAMPOUX — 3,566,662

COLDWORKING METHOD AND APPARATUS

Filed April 28, 1969 — 2 Sheets-Sheet 1

INVENTOR.
LOUIS A. CHAMPOUX

BY

AGENT

INVENTOR.
LOUIS A. CHAMPOUX

United States Patent Office 3,566,662
Patented Mar. 2, 1971

3,566,662
COLDWORKING METHOD AND APPARATUS
Louis A. Champoux, Seattle, Wash., assignor to The
Boeing Company, Seattle, Wash.
Filed Apr. 28, 1969, Ser. No. 819,896
Int. Cl. B21d 39/06
U.S. Cl. 72—370                                    13 Claims

ABSTRACT OF THE DISCLOSURE

A method and apparatus using disposable sleeves for coldworking of holes. The apparatus uses a tapered oversized plug element with a thereon positioned thin-walled split sleeve. The plug element is inserted with the sleeve into a hole. When the plug element is pulled back through the hole, the sleeve is kept in the hole by the apparatus so that radially outwards directed forces are exerted by the plug on the sleeve, which in turn transmits the coldworking forces to the wall of the hole. After the plug is pulled out of the hole, the sleeve is removed from the hole and discarded.

BACKGROUND OF THE INVENTION

(1) Field of the invention

This invention relates to a method and apparatus for the coldworking of holes. Coldworking of holes is a process which increases the fatigue life of holes in workpieces under stress. In the manufacturing of airplane wings and body structures, coldworking and deburring of holes is necessary for fatigue improvement.

(2) Description of the prior art

In the conventional coldworking process of holes, a tapered oversized plug is pulled or pushed through a hole, stretching the inner lining of the hole, thereby creating compressive stresses around the hole. In the prior art various methods are shown wherein a tapered plug in conjunction with a split sleeve for exerting radially outward directed forces is used. However, these arrangements are shown for expanding tubes and not for coldworking of holes, which in itself is an entirely different type of art and science. For example, various tube expanding methods and apparatus can be found in patents issued to Young et al., 684,661 and Geyer, No. 2,459,808. As will be explained hereinafter, these types of methods expand a tube or the like via a resilient sleeve element and oversize plug. In addition, because of the frictional forces, a lubricant may be used. The present invention uses a sleeve which does not expand, since the friction is so high that the material of the sleeve cannot move. Thus, a radial force is transferred through the stainless steel sleeve.

In the prior art of coldworking holes an oversized mandrel was pulled through a lubricated hole and the lubrication material used consisted of hydrocarbon lubricants, such as cetyl alcohol and lauric acid. In the present invention, which is an improvement in the coldworking technique because a high fatigue improvement is achieved, this type of method would not work because of galling problems and insufficient lubrication.

SUMMARY OF THE INVENTION

The present invention herein described is an improvement in the coldworking technique and can be regarded as one of the most important breakthroughs in fatigue improvement methods for fastener holes.

The coldworking method and apparatus as explained hereinafter will improve the fatigue life, since this method will stretch the workpiece beyond the yield strength of the workpiece, for instance, 50–80,000 p.s.i. for 2024 aluminum. Furthermore, the method incorporates the use of an apparatus and sleeve which reduces handling procedures in the coldworking steps. The conventional coldworking of a hole required an operator at each side of the workpiece, the hole had to be lubricated and excess lubricant had to be removed. The mandrel was partly pushed from one direction through the hole by operator "one" and attached to a puller by operator "two," after which the mandrel was pulled through.

In the manufacture of airplanes a large quantity of 2024–T351 and 7075–T651 aluminum is used. Of course, fatigue problems do exist and become more severe because oscillating loads or rather fatigue cycles of the constructed airplane components increase with the larger and faster plying airplanes. The requirements and specifications for fatigue improvement cannot be obtained with the standard coldworking procedures and the lubricants used, cetyl alcohol and lauric acid for this process are not adequate anymore. Also, because the pressures of the workpiece against the coldworking tool are very high, somewhere between the tensile yield and bearing yield strength of the material being coldworked. For example, in 2024–T351 aluminum, the pressure against the coldworking tool and the lubricant is between 42,000 and 60,000 p.s.i., causing galling and tool breakage. After a series of experiments a single split prelubricated thin wall sleeve was developed which stretches but does not expand as the hole is being coldworked. The inside of the sleeve was coated with solid film lubricant. This type of lubricant is sprayed on in liquid form and hardens. Many solid film lubricants are commercially available and each contain in general a composition of lead oxide, graphite and molybdenum disulfide. This lubricant film is capable of withstanding better than 100,000 p.s.i. The use of the solid lubricant in combination with the sleeve makes it possible to work with much greater interferences or with other words less difference between tool and hole diameter, increasing the efficient degree of coldworking and also the fatigue life of the fastener joint.

A more sophisticated approach to the preferred embodiment of the present invention is shown in the use of helical coil type sleeve. This type of sleeve will eliminate the small ridge in the surface of the hole created by the single split type sleeve. Also, the helical sleeve can be made to coldwork holes in much larger stack-ups than possible with the split sleeve.

It should be noted that expandable collet type sleeves were used to eliminate without success. The friction between these sleeves and the wall of the hole is very high, preventing the expansion of the expandable sleeve. This resulted in a very high pulling force and tool breakage. Thus, the present stainless steel sleeve which is used in this novel method of coldworking does not expand, but does stretch and is unusable after use and thus discarded.

In general, the method for coldworking holes comprises the steps of positioning a prelubricated sleeve of a material having a higher modulus and yield than the material of the associated workpiece onto a coldworking mandrel, inserting the mandrel and sleeve into a hole to be coldworked in an associated workpiece, and holding the sleeve in the hole while retracting the mandrel from the workpiece, thereby compressing the material of the sleeve in a radial direction taken from the center axis of the hole.

It is therefore an object of the present invention to provide a method for coldworking of holes which reduces the steps necessary in conventional coldworking procedures and further provides for high fatigue improved holes.

It is a further object of the present invention to provide a novel method and apparatus using sleeves for coldworking holes wherein the fatigue cycle vs. the coldworking interference is significantly improved.

It is an additional object of the present invention to provide for an improved coldworking method and apparatus using sleeves having a helical split configuration.

BRIEF DESCRIPTION OF THE FIGURES

Further objects and advantages of the present invention will become apparent from the following description taken in conjunction with the accompanying drawings.

In the drawings.

DESCRIPTION OF THE INVENTION

When considering the most essential steps of the improved method for coldworking holes in order to replace fatigue resistance as disclosed herein, reference should be made to FIGS. 1 through 4.

Figure 1:
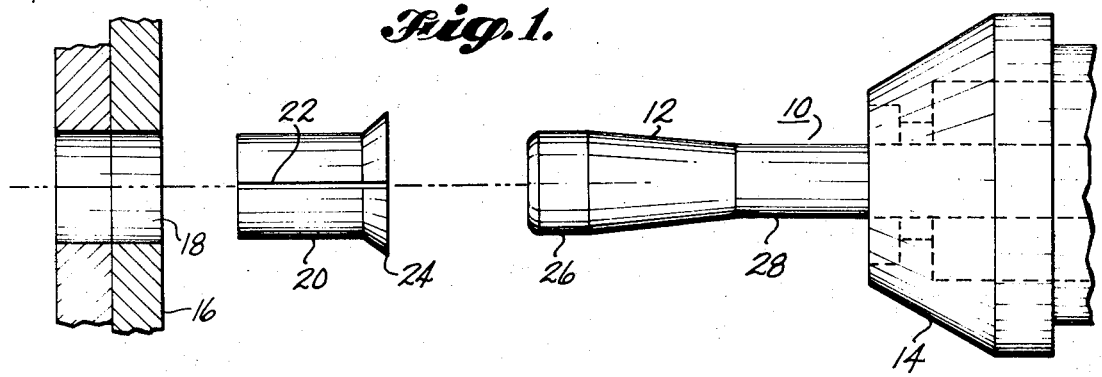
FIGS. 1 to 4 show the major steps of the coldworking method. The workpiece, sleeve and mandrel or coldworking apparatus are illustrated when appropriate in cross section for explanatory purposes.

In FIG. 1 the coldworking apparatus 10 having a mandrel 12 and holding means 14 is lined up with a workpiece 16 having a hole 18 to be coldworked. In between the workpiece 16 and mandrel 12 is a sleeve 20 having a slot 22 and shoulder 24.

The first step of operation is to slide the sleeve 20 over the larger diameter portion 26 of the mandrel 12 which by doing so will expand the seleeve 20 and the retraction of the somewhat resiliency of the sleeve material will provide for a holding attachment of the sleeve 20 onto the mandrel 12 at the smaller diameter portion 28.

Figure 2:
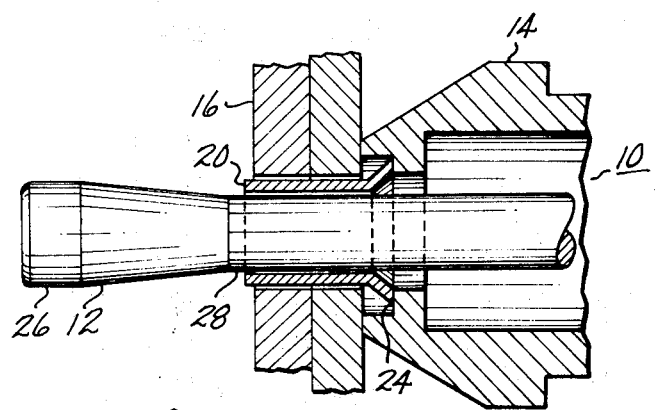

In the second step, illustrated in FIG. 2, the mandrel 12 is completely inserted in the hole 18 and the holding means 14 are resting against the should 24. It will be obvious that the outside diameter of the portion 26 and the sleeve 20 are slightly smaller than the hole 18 diameter, which is properly illustrated in FIG. 2.

Figure 3:
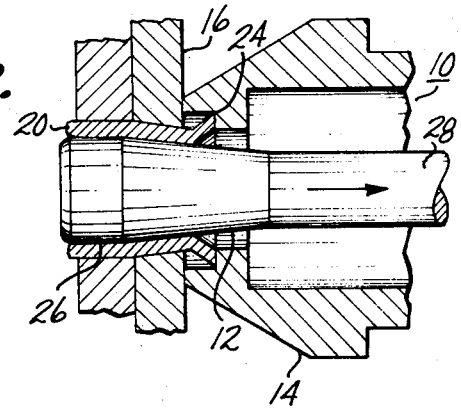

The most important step of the coldworking method is illustrated in FIG. 3 wherein the mandrel is pulled back and exerts a radially directed force into the sleeve 20. The sleeve 20, because of the high friction, does not move in a circulatory direction but the material is compressed somewhat and at the same time the sleeve diameter is enlarged which enlarges the hole diameter, thus coldworking the hole 18. Of course, the illustration is just for explanatory purposes and the deforming of the sleeve is shown exaggerated. As a matter of fact the deformation is in respect to the compression of the material only microscopically detectable. However it should be definitely understood that the sleeve does not move, because of the high frictional force, but its diameter is stretched. As a result of this process, the transferring of the forces in a radial direction via the sleeve makes the sleeve unusable for further coldworking operations. As shown during the process or method, the sleeve has been held in FIGS. 2 and 3 against the workpiece 16 by the holding means 14 of the apparatus 10 resting against the shoulder 24 of the sleeve 20. However, it should be understood that a shoulder is not necessary but just for convenience to prevent slippage before applying the second step as described. In practice the coldworking method has been mostly accomplished by the used of sleeves without a shoulder and an apparatus was used which had a close fit circumference about the larger diameter portion of the mandrel so that during operation of the method the sleeve was not shoved away before the friction was applied.

Figure 4:
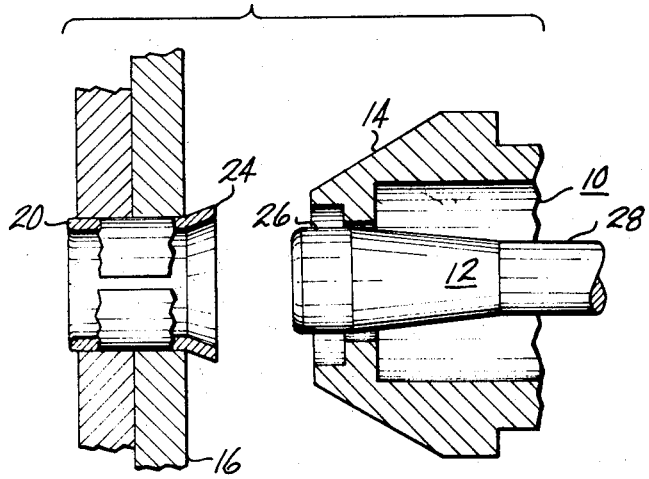
Figure 5:
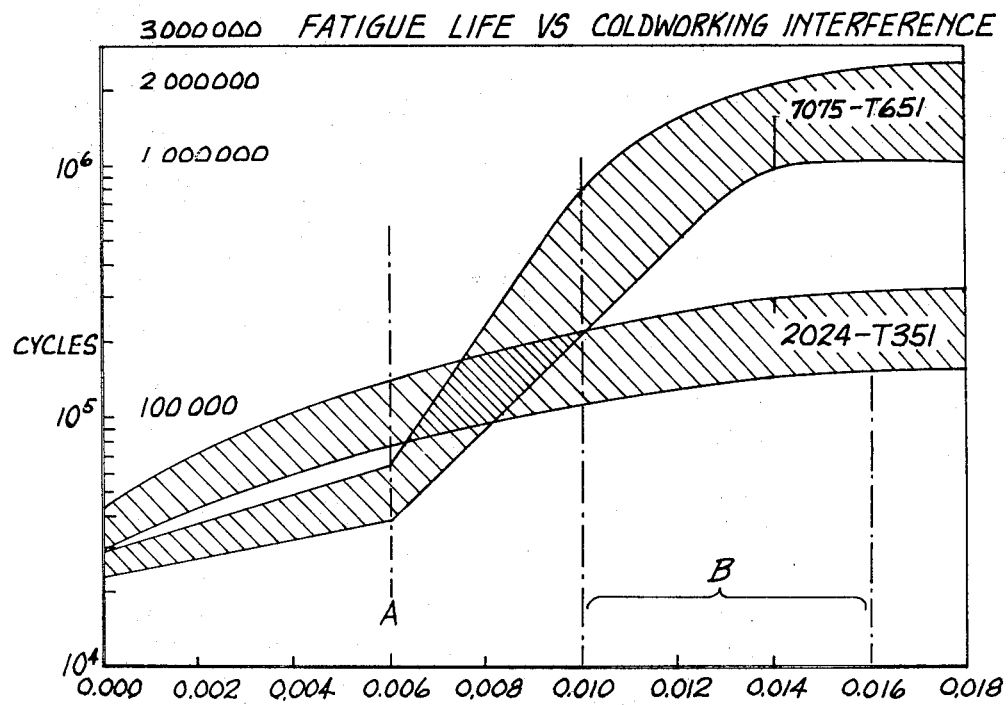
FIG. 5 is a graphic illustration of the fatigue life improvement for 7075–T651 and 2024–T351 types of aluminum. The obtained improvement of the persent invention is illustrated in the B region vs. the conventional coldworking interference A parameters.
Figure 6:
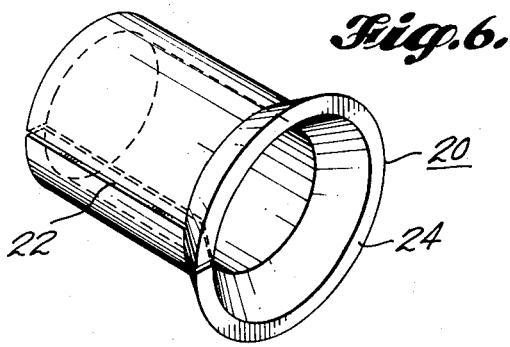
FIG. 6 is an isometric view of a typical sleeve with straight slot and shoulder.

In FIG. 4 the tool has been removed and the sleeve, which, as has been discussed, cannot be reused, is now removed from the hole and discarded by simply contracting the should 24 and thus closing the slot or shortening the diameter against the resiliency quality of the material (stainless steel in most cases). By using the present method on aluminum 7075–T651 and 2024–T351 a graph was plotted showing the fatigue life vs. coldworking interference as illustrated in FIG. 6. The fatigue improvement obtained is shown in the B region in comparison with the conventional obtained and required coldworking parameters at A. Aluminum 7075 and 2024 were taken since these two types are used for its majority in present day aircraft construction.

Figure 7:
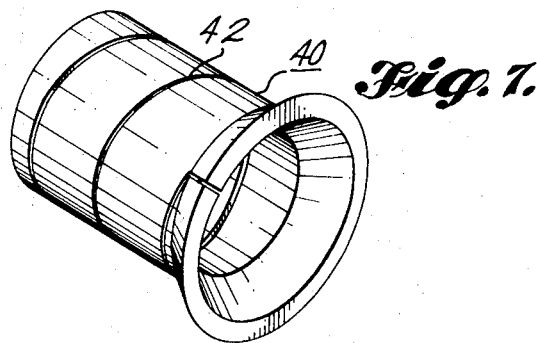
FIG. 7 is an isometric view of a sleeve having a helical slot configuration.

The sleeve 20 as shown in the first preferred embodiment and used in the described steps has a slot 22 at its side which enables the sliding of the sleeve on the tool as well as resting of the sleeve outside surface against the hole 18 wall, prior to the applied frictional force because of the inherent resiliency of the sleeve's material. However after the coldworking has been performed the hole showed a small ridge due to the slot area. This ridge does not interfere or cause any harm since its protruding portion is barely noticeable but nevertheless an improved version was designed as illustrated in FIG. 7. The sleeve 40 is of the same type of material for the same principles of operation and act similar as sleeve 20 with the straight slot 22 except for the ridge portion as mentioned. Here by the use of sleeve 20, removal of the helical slotted sleeve 40 does not show a ridge but only a very thin almost unreadable line showing a spiralled imprint in hole 18. It should be understood, however, that the type and configuration of the sleeve can be varied as illustrated without changing the concept of the invention, and furthermore that variation may be made without departing from the scope of the invention as defined in the appended claims.

What is claimed is:

1. A method for coldworking holes which comprises the steps of:
   (a) positioning a prelubricated sleeve of a material having a higher modulus and yield than the material of an associated workpiece having a hole onto a coldworking mandrel,
   (b) inserting the mandrel and sleeve into the hole to be coldworked, and
   (c) holding the sleeve in the hole while retracting the mandrel from the workpiece, thereby compressing the material of the sleeve in a radial direction taken from the center axis of the hole.

2. A method for coldworking holes as claimed in claim 1 wherein the step of positioning includes the step of sliding a prelubricated sleeve onto the mandrel to a section having a lesser diameter.

3. A method for coldworking holes as claimed in claim 1 wherein the step of positioning includes the step of expanding the diameter of a prelubricated spring-biased split sleeve and of sliding the sleeve to a position on the mandrel of reduced mandrel diameter.

4. A method of coldworking holes as claimed in claim 3 wherein the step of positioning includes the steps of expanding the inside diameter of the sleeve so that the outside mandrel diameter is substantially equal to the inside sleeve diameter and contracting the inside diameter of the sleeve to the reduced mandrel diameter portion on the mandrel so that said inside sleeve diameter is substantially equal to said reduced mandrel diameter.

5. A method for coldworking holes as claimed in claim 4 wherein the step of inserting includes positioning the mandrel and sleeve into the hole coincident with that portion of said reduced mandrel diameter surrounded by the sleeve.

6. A method for coldworking holes as claimed in claim 5 wherein the step of retracting the mandrel from the workpiece includes:
   (a) sliding of the mandrel out of the sleeve and
   (b) stretching the outside diameter of the sleeve beyond the hole diameter.

7. The apparatus for coldworking of holes in a workpiece using disposable sleeves in conjunction with its operation comprising in combination:
   (a) a mandrel having an outside larger and outside smaller diameter,
   (b) a resilient split sleeve to be used as spacer during coldworking operation for receiving exerted sliding expansion forces from said larger diameter portion of said mandrel while simultaneously adapted to carry said forces in a radial direction to said hole inside surface for hole enlargement and material compression in order to improve fatigue properties of said workpiece.

8. The apparatus for coldworking holes in a workpiece as claimed in claim 7 wherein a means is provided in conjunction with said apparatus for holding said sleeve into said hole to be coldworked in said workpiece while said mandrel larger diameter passes through and out of said sleeve and workpiece.

9. The apparatus for coldworking holes in a workpiece as claimed in claim 8 wherein said sleeve has a split arrangement to enhance said sleeve's resiliency and wherein said sleeve is made of material having a higher modulus and yield quality than said associated workpiece material.

10. The apparatus for coldworking holes in a workpiece as claimed in claim 9 wherein said sleeve is provided with a lubricant type of coating.

11. The apparatus for coldworking holes in a workpiece as claimed in claim 10 wherein said sleeve is provided with a shoulder for complementing said sleeve holding means.

12. The apparatus for coldworking holes in a workpiece as claimed in claim 7 wherein said sleeve split for enhancing the resiliency is disposed in a helical direction along said sleeve body configuration.

13. The apparatus for coldworking holes in a workpiece as claimed in claim 11 wherein said sleeve split for enhancing the resiliency is disposed in a helical direction along said sleeve body configuration.

References Cited

UNITED STATES PATENTS

| | | | |
|---|---|---|---|
| 1,647,447 | 11/1927 | Hartnett | 72—370 |
| 3,270,410 | 9/1966 | Salter et al. | 29—446 |

LOWELL A. LARSON, Primary Examiner

U.S. Cl. X.R.

29—446; 72—392